United States Patent
Chubb et al.

(10) Patent No.: US 6,221,188 B1
(45) Date of Patent: Apr. 24, 2001

(54) SIMULATED ICE CRYSTAL FORMATION ON SUBSTRATES BY GLUE CHIPPING

(75) Inventors: Richard A. Chubb, Gloucester City, NJ (US); Thomas Grant, Jr., Oakbrook, IL (US)

(73) Assignee: Thermoseal Glass Corp., Gloucester City, NJ (US)

( * ) Notice: Subject to any disclaimer, the term of this patent is extended or adjusted under 35 U.S.C. 154(b) by 0 days.

(21) Appl. No.: 09/286,738

(22) Filed: Apr. 6, 1999

(51) Int. Cl.[7] .............................. B44C 1/22; C03C 15/00; C03C 25/68
(52) U.S. Cl. .............................. 156/63; 156/153; 156/154
(58) Field of Search .................................. 156/153, 154, 156/63, 281; 428/141

(56) References Cited

U.S. PATENT DOCUMENTS

| | | | |
|---|---|---|---|
| 495,375 | * | 4/1893 | Savary . |
| 4,199,358 | * | 4/1980 | Parsons ................................ 430/308 |
| 4,323,423 | * | 4/1982 | Schrunk . |
| 4,427,729 | * | 1/1984 | Messer . |
| 4,436,776 | * | 3/1984 | Wojcik . |
| 4,451,329 | * | 5/1984 | Batchelor et al. . |
| 5,721,013 | * | 2/1998 | Pratt . |

\* cited by examiner

Primary Examiner—Jeff H. Aftergut
(74) Attorney, Agent, or Firm—John Lezdey & Assoc

(57) ABSTRACT

A process for producing an article having a three-dimensional optical effect comprising a transparent substrate provided with a translucent simulated ice crystal formation having a controlled amount of fern-like patterns along with articles produced by a glue chip process.

10 Claims, 3 Drawing Sheets

SIMULATED ICE CRYSTAL FORMATION ON SUBSTRATES BY GLUE CHIPPING

BACKGROUND OF THE INVENTION

1. Field of the Invention

The present invention is generally concerned with providing an article having a three-dimensional decorative appearance, particularly in producing an article having a continuous or discontinuous pattern simulating a reproducible natural ice crystal formation for use in the decorative glass industry, and most particularly for use on doors and windows.

2. Description of the Prior Art

Frosting articles, particularly those made of glass or plastic, for aesthetic reasons, has long been known and used in -many diverse industries. These industries include architecture/construction, packaging, display systems and furniture making. Conventional frosting of these substrates is achieved either chemically by an etching liquid such as an acid solution, or mechanically by abrading such as by sandblasting. Another method known in the prior art which is utilized to provide a textured surface on glass, comprises the steps of applying animal hide glue to the surface of the glass which has been sandblasted, then heating the glue and allowing it to dry. This causes the glue to pull chips from the surface, thereby producing a random frosting pattern with an overabundance of fern-like surface patterns. For these reasons, the conventional glue chip process does not yield an ice crystal formation which closely simulates a natural pattern. Such a glue chip process is discussed in U.S. Pat. No. 5,631,057 to Carter, which is directed to yet another method of providing a decorative appearance that involves adhering appliques to the surface of the glass.

The aforementioned methods produce articles that are primarily decorative or advertising in nature, are frequently unique and are difficult to reproduce in exactly the same pattern on a commercial scale. In attempting to reproduce an intricate pattern such as natural ice formation, the problem is magnified. The use of a natural ice crystal formation pattern for imparting the illusion of a very cold environment for beverage dispensing machines and other refrigerated products that are displayed and merchandised behind glass in various refrigerated commercial equipment is very desirable from a marketing standpoint.

None of the prior art techniques discussed above provides a satisfactory three dimensional ice crystal effect on two dimensional optically transparent substrates, which can be duplicated in high volumes. Therefore, there exists a need in the decorative glass industry to provide a process which produces a translucent three-dimensional optical effect which closely simulates natural ice crystal formation on a suitable substrate, wherein the pattern can be reproduced in large quantities.

SUMMARY OF THE INVENTION

In its broadest aspect, the present invention provides a three-dimensional optical effect simulating the appearance of a natural ice formation on the surface of a glass. It is preferred that the glass substrate is optically transparent, although translucent and opaque substrates can be used. The ice crystal formation produced by the present process closely resembles ice crystal formations found in nature by controlling the configuration and number of the fern-like surface patterns associated with the prior art methods discussed. In accordance with the present invention in its broadest aspect, the process for producing a glass article having a three dimensional optical effect pattern comprises the steps of:

a. applying a screen pattern onto a glass substrate;
b. screen printing a masking agent coating composition on the substrate to provide an exposed area to form an outline of the natural ice crystal formations;
c. curing the masking agent coating composition;
d. cooling the coated substrate;
e. sandblasting the exposed area with a medium grit;
f. cleaning the sandblasted surface area;
g. applying an animal hide glue composition to the sandblasted glass surface;
h. dehumidifying the glue composition coated on the substrate;
i. heating said coated substrate to provide a first shrink of the glue composition to chip the glass substrate and initiate formation of a natural ice crystal pattern thereon;
j. removing the chipped glass, glue composition and masking agent residues from the glass substrate;
k. reheat the glass substrate having a natural ice crystal pattern to provide a final shrink of the glue composition on the substrate; and
l. recovering a glass substrate having a translucent simulated ice crystal formation containing from about 20 to 50 percent of a fern-like surface pattern within said formation based on the total surface area of the ice crystal formation.

The masking agent coating composition is selected from vinyl resins, which can be cured by thermally initiated polymerization. Vinyl plastisols are the preferred masking agents. Plastisols are liquid compositions produced by spray-drying latices obtained from the emulsion polymerization of vinyl chloride. The latex particles are dispersed into plasticizers, such as phthalate esters, phosphate esters, adipates, azelates, oleates and sebacates, epoxy plasticizers, fatty acid esters, and glycol derivatives. The polymer particles do not dissolve in the liquids, but remain dispersed until the mixture is heated. Fusion then yields a final plastic film.

The process yields an article of manufacture which possess high standards of quality control regarding the reproducibility of the ice crystal formation.

It is therefore a primary object of this invention to provide a simulated resembling a natural ice crystal formation which has a three dimensional translucent appearance on a glass substrate.

Another object of this invention is to provide a clear glass substrate with a simulated ice crystal formation that closely resembles a natural ice crystal formation by controlling the configuration and number of the fern-like patterns and that can be reproducible in a commercial process. Another related object of this invention is to provide a decorative ice crystal effect on optically transparent glass substrates.

A more particular object of this invention is to provide a process which imparts a translucent three-dimensional simulated ice crystal formation on transparent glass substrates, such as doors and panels of refrigerated units.

An associated particular object of this invention is to provide a process which produces a three-dimensional simulated translucent ice crystal formation on translucent and opaque glass substrates such as drinking glasses, mugs, panels and bottles.

A further particular object of this invention is to provide a three dimensional appearance simulating a natural ice crystal formation on a suitable glass substrate wherein the pattern is continuous.

Yet another particular object of this invention is to provide a three dimensional appearance simulating a natural ice crystal formation on a suitable glass substrate wherein the pattern is discontinuous.

BRIEF DESCRIPTION OF THE DRAWINGS

The characteristics and advantages of the invention emerge from the following description given by way of example only with reference to the appended drawings in which.

DETAILED DESCRIPTION OF THE PREFERRED EMBODIMENTS

Figure 1:
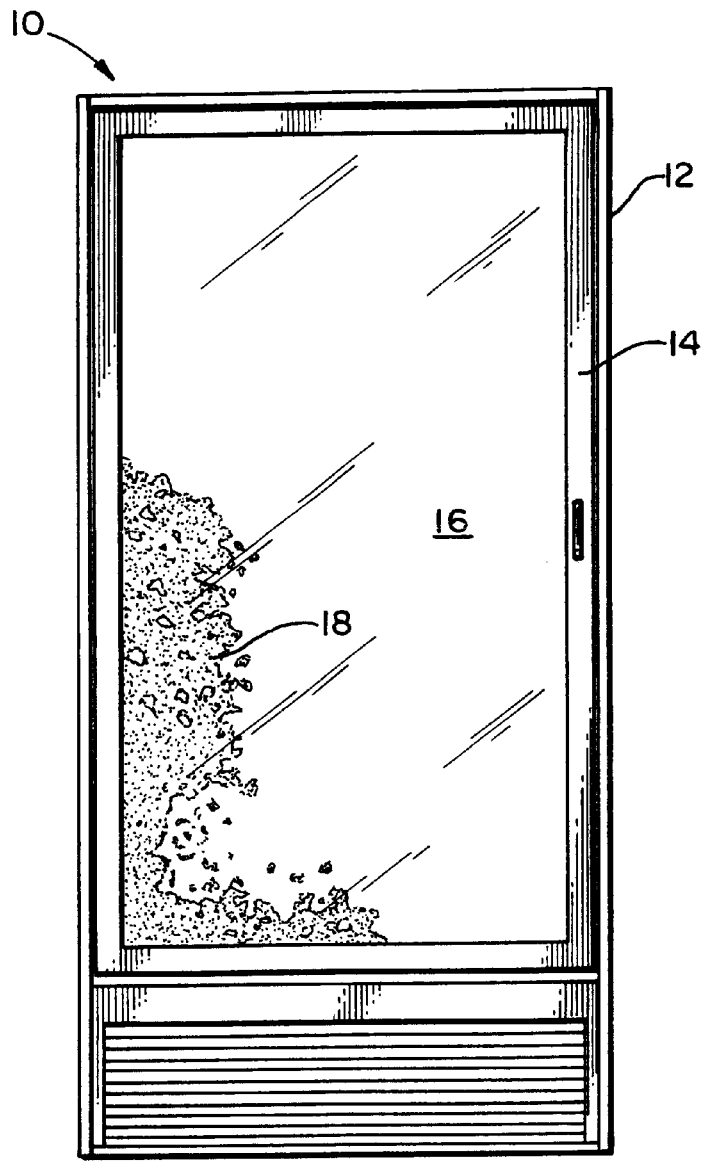
FIG. 1 is a door unit of a refrigerated display case having a transparent glass carrying a translucent discontinuous pattern on the surface simulating the appearance of a natural ice crystal formation.
Figure 2:
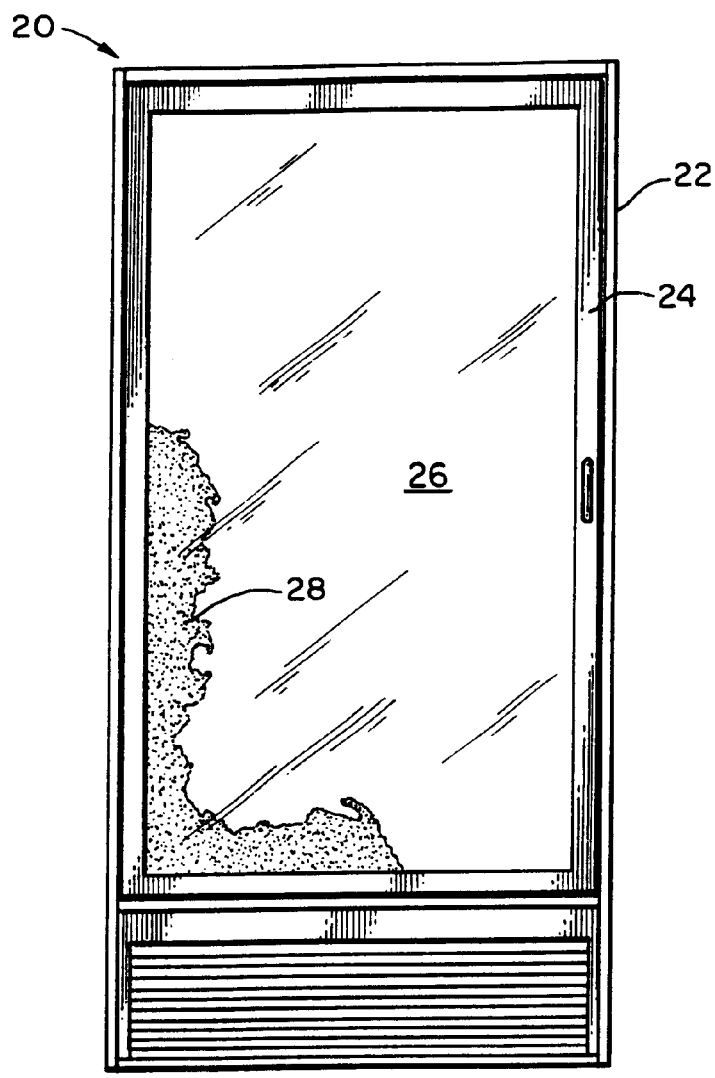
FIG. 2 is a door unit of a refrigerated display case having a translucent continuous pattern of a simulated natural ice crystal formation according to the invention.
Figure 3:
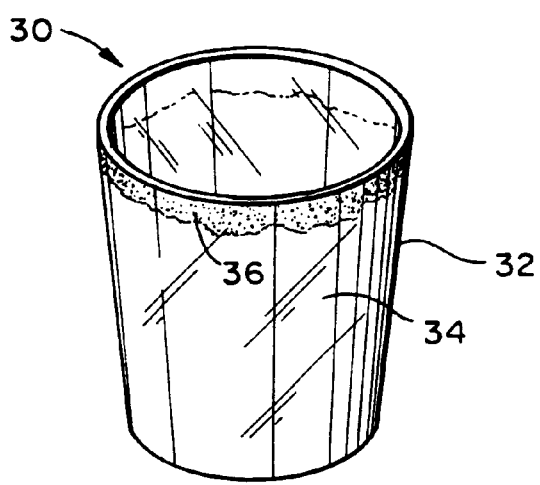
FIG. 3 is a drinking glass having a translucent continuous pattern of a simulated natural ice crystal formation according to the invention.
Figure 5:
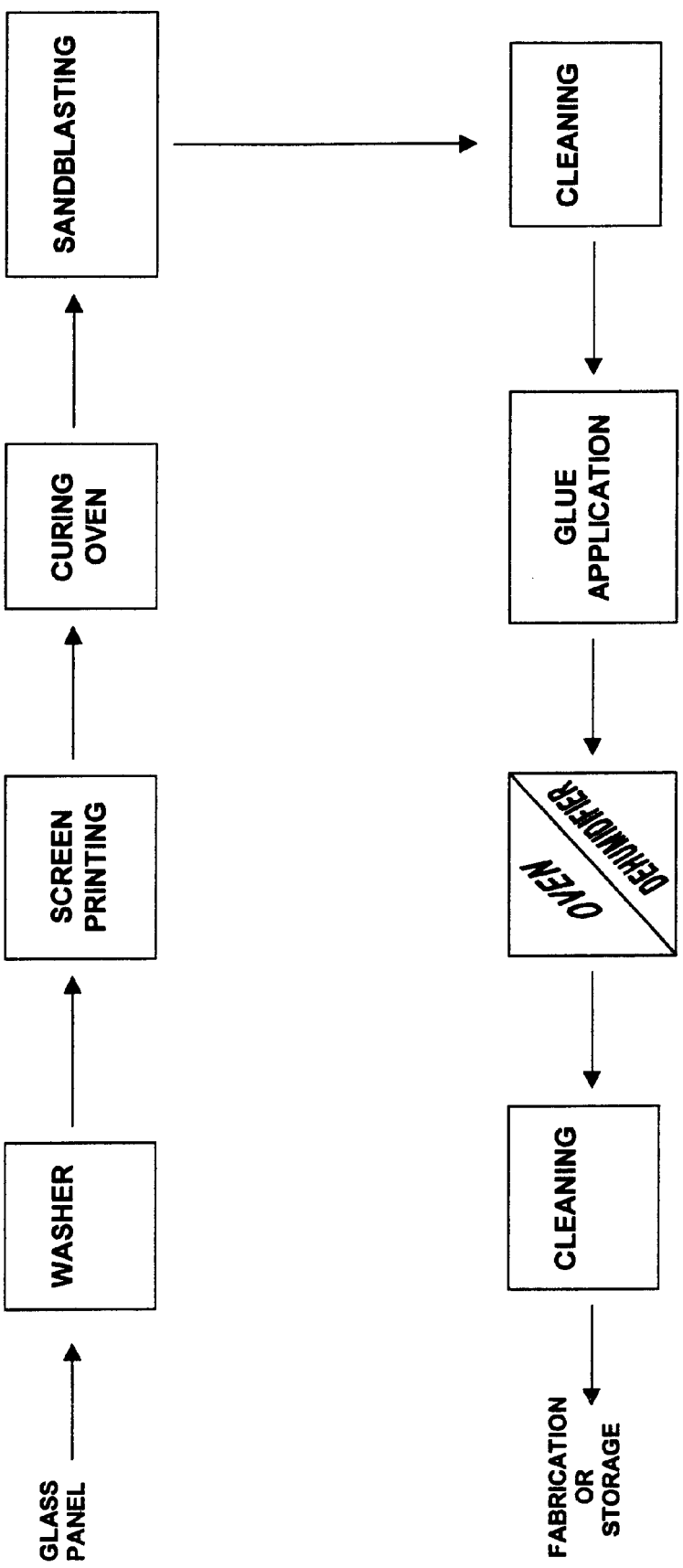
FIG. 5 is a schematic view of the process according to the invention.

In accordance with the present invention, a glass article is produced having a translucent three-dimensional simulated ice crystal formation in which the configuration and number of fern-like structures are controlled. Referring to the drawings in detail wherein the applied reference numerals indicate parts that are similarly identified. FIG. 1 shows an optically transparent door panel unit 10 of a refrigerated display case comprising a transparent glass 16 carrying a translucent discontinuous pattern on the surface of the glass simulating the appearance of a natural ice crystal formulation 18 within door frame 14 and attached on support frame 12. FIG. 2 basically is the same construction as described in FIG. 1 except that the ice crystal formation is shown as a continuous pattern. In FIG. 5 a simplified flow diagram is presented showing the major steps in the process of the invention. on glass surface. The following steps illustrates only one application of the present invention. In one preferred embodiment, flat glass panels supported on a conveyor are moved through a series of operations. First the glass sheets are moved through a WASHER where detergent solutions and rotating brushes may be used to remove any dirt from the surface of the glass sheets, which are then dried by either heat or compressed air.

Next, the glass sheet is conveyed to a SCREEN PRINTING station where an outline of ice crystal formation pattern is placed on the panel to be coated. A masking agent coating composition is applied by screen printing a vinyl resin coating onto the surface of the glass to provide an exposed area where the formation of a natural ice crystal formation occurs. Upon completion of the printing step, the glass sheet is then moved through a CURING OVEN where the masking agent coating composition is cured. After exiting the CURING OVEN, the panel is cooled and transferred to a SANDBLASTING station where the exposed surface is sandblasted with a medium sized grit cleaned and moved to a GLUE COATING station when an animal hide glue is applied on the sandblasted area by brushing, spraying or by a doctor blade at a proper thickness to provide the outline of the ice crystal formation. The glue coated panel is moved to a DEHUMIDIFIER/OVEN station. The coated panel proceeds to the dehumidifier equipment in which the air is circulating at a moderate velocity in a random flow pattern. Once the glue has reached the proper moisture content, the chamber is switched from the dehumidification mode to the heating mode where a first glue composition shrinking mechanism is initiated to chip the glass surface to begin the formation of the ice crystal formation. After a proper reaction period, the workpiece is withdrawn from the oven and cooled, and moved to a CLEANING station to remove the masking agent coating composition, as well as, glass and glue residues. Upon inspection, if the desired crystal formation is formed, the panel is passed to fabrication or storage.

The glass substrates which may be used in the present invention may be of any size or shape, limited only by the capacity of the machinery available. Preferably plates or sheets of commercial plate, float or sheet glass composition are used. It is preferred when the ultimate utility involves doors and windows that the glass sheet is optically transparent, however, the glass substrate may be tinted if desired with colorants such as with dyes or pigments. For other uses such as in drinking glasses and mugs, bottles, inter alia, opaque or translucent glass substrates may be employed.

Forming the simulated ice crystal formation on a silk screen pattern involves either computer generated imaging or hand drawing the formation pattern on paper or vellum in black and white. Photographing the black and white image to develop a full-size film positive of an outline of the ice crystal formation image that is properly sized for the substrate. The silk screen pattern may show the ice crystal formation in a continous or discontinous pattern. In the discontinous pattern, openings or islands are positioned randomly within the formation. The masking agent coating is applied onto the glass substrate, in a pattern so as to provide an outline of the desired ice crystal pattern effect in an exposed area while entirely coating the remaining areas of the substrate.

The masking agent coating compositions which may be applied by screen printing in the practice of this invention are based on thermoplastic resins which are cured by the thermal initiation. The masking agent composition is applied in thicknesses ranging from about 0.032 to 0.0625 inch.

An important feature of the invention is the control of the texture of the ice crystal formation by the combined adjustment of the ratio of the glue to water mixture and the thickness of the glue mixture applied to the glass substrate. Broadly the ratio of glue to water ranges from 50 to 75 weight percent glue and 50 to 25 water. Preferably the animal hide glue coating composition is a mixture of about 60 weight percent glue and 40 weight percent water with applied thicknesses ranging from 0.032 to 0.125 inch. If a finer chipping pattern and more fern-like structures are intended then a glue to water ratio ranges from between about 50 to 50 weight percent. Conversely if a more rugged or more deeply-chipped effect with less fern-like structure is desired then a ratio of the glue to water mixture ranges, from between about 40 to 60 weight percent.

Another important factor in achieving a simulated ice crystal formation includes controlling the number and configuration of the fern-like structures within the ice crystal formation.

Figure 4:
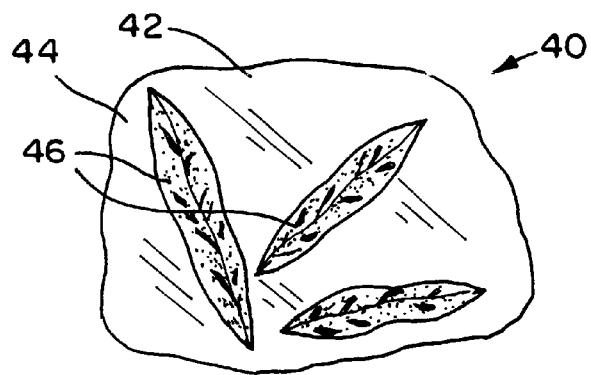
FIG. 4 is a magnified close-up of the fern-like pattern formed within the ice crystal formations.

As mentioned earlier in this disclosure, the frosting pattern produced by the conventional glue chip process produces an undesirable fern-like surface texture. FIG. 4 shows a magnified close-up of such fern-like surface structures 44 within the ice crystal formation pattern on the glass substrate of the perimeter portion of a door panel 40. An overabundance of these fern-like structures or textures is undesirable, since they diminish the natural effect desired in simulated ice crystal formation patterns. Therefore, the random configuration of the spine 42 and branches 46 in the fern leaf also has an important effect in reproducing a natural ice crystal formation. The process of this invention not only produces a more natural ice crystal formation by controlling the configuration and amount of fern-like structures, but provides reproducible results even in high volume production.

The present invention will be more fully understood from the description of the specific example in which all percentages are by weight and follows:

EXAMPLE 1

A silk screen having a discontinous pattern in the form of a simulated ice crystal formation is placed on a previously cleaned optically transparent glass panel measuring 30 to 60 inches. The silk screen pattern is a film positive, i.e. it masks the area where the ice crystal formation is to be formed and exposes the remainder of the panel. In this instance the discontinous pattern requires islands of untreated glass within the ice formation in the final article and in the film positive these areas are exposed.

A plastisol masking agent is then screen printed in the same pattern as the film positive to mask the above mentioned islands of untreated glass and the larger area of the panel. The coated glass substrate is transferred to an oven and thermally cured at temperatures maintained at approximately 300–400 degrees F for about 5 to 15 minutes. Then after cooling, the masked glass substrate is cleaned of excess plastisol, the exposed areas are sandblasted with 150–240 grit aluminum oxide at about 40 to 80 psi using dry compressed air. Further, the compressed air is used to blow away the excess sand and glass debris.

An animal hide glue composition comprising 60 weight percent animal hide glue (Animal Glue No. 5, marketed by Milligan & Higgins, Fort Lauderdale, Fla.) and 40 weight percent water is applied by brushing in a thickness ranging from 0.317 to 0.125 inch.

Upon completion of the glue coating operation, the panel is maintained in a generally horizontal position. The glue coated panel is passed into a dehunidifier/oven apparatus wherein air is circulating at a moderate velocity in a random flow pattern. After the moisture is reduced within the range of about 5 to 10 percent, the dehumidification cycle was stopped and the heating cycle was begun to initiate the glass chipping process by shrinking the glue composition, and wherein a temperature range of about 100 to 130 degrees F is maintained. After about 6 to 8 hours, the glass chipping produces a discontinous simulated ice crystal formation on the glass substrate.

The workpiece is passed from the oven to a cleaning station and cleaned with compressed air at about 100 psi to remove the glass debris, glue residue and masking agent coating.

The glass substrate having the discontinous simulated ice crystal formation is transferred into an oven held at a temperature range of about 325 to 350 degrees F for about 2 to 3 minutes to provide a final-shrink of the residual glue coating to provide the end article wherein 20 to 50 percent surface area of the ice -crystal formation contains. The article is again cleaned and moved to storage or to further fabrication.

While this invention has been described in terms of certain embodiments therof, it is not intended that it be limited to the above description, but rather only to the extent set forth in the following claims. The embodiments of the invention in which a exclusive property or privilege is claimed are defined in the appended claims.

What is claimed is:

1. A glue chip process for producing a glass article having a three dimensional optical effect comprising the steps of:

a. applying a screen print having an outline of a natural ice crystal pattern onto a glass substrate;

b. screen printing a masking agent coating composition onto a glass substrate to provide an exposed area where a pattern of a natural ice crystal formation is to be formed;

c. curing said masking agent coating composition;

d. cooling said coated substrate;

e. sandblasting said exposed area with a medium grit;

f. cleaning the sandblasted surface area;

g. applying an animal hide glue composition to the sandblasted glass surface;

h. dehumidifying the glue composition coated on the substrate;

i. heating said coated substrate to provide a first shrink of the glue composition to chip the glass substrate to form a natural ice pattern thereon;

j. removing the chipped glass, glue composition and masking agent residues from the glass substrate whereby some residual glue composition may be present;

k. reheating the glass substrate having a natural ice crystal pattern to provide a final shrink of any of the residual glue composition on the substrate; and l. recovering a glass substrate having a translucent simulated ice crystal formation having less than fifty percent fern-like patterns within said formation based on the total surface area of said ice crystal formation.

2. The process of claim 1 wherein said masking agent composition is selected from vinyl resins.

3. The process of claim 2 wherein said vinyl resin is a plastisol.

4. The process of claim 1 wherein said masking agent composition is cured at 300–400 degrees F.

5. The process of claim 1 wherein said glue composition ranges from about 50 to 75 weight percent animal hide glue and from about 25 to 50 weight percent water.

6. The process of claim 1 wherein said glue composition comprises about 60 weight percent animal hide glue and from about 40 weight percent water.

7. The process of claim 1 wherein said first shrink of the glue composition to effect glass chipping of the substrate in step i. is conducted at temperatures maintained at about 100 to 130 degrees F.

8. The process of claim 1 wherein said glass substrate is optically transparent.

9. The process of claim 1 wherein said dehumidifying step h. is conducted with air circulating at a moderate velocity in a random flow.

10. The process of claim 1 wherein said final shrink of the residual glue composition in step k. is conducted at temperatures maintained at about 320 degrees to 360 degrees F.

* * * * *